United States Patent [19]

Hensley

[11] Patent Number: 4,802,511
[45] Date of Patent: Feb. 7, 1989

[54] SHIRRED TUBULAR MATERIAL

[75] Inventor: Norman G. Hensley, Lafayette, Ind.

[73] Assignee: Teepak, Inc., Oak Brook, Ill.

[21] Appl. No.: 641,136

[22] Filed: Aug. 15, 1984

Related U.S. Application Data

[63] Continuation-in-part of Ser. No. 547,817, Nov. 1, 1983, abandoned.

[51] Int. Cl.⁴ .............................................. F16L 11/10
[52] U.S. Cl. .................................. 138/118.1; 138/122; 138/177; 17/1 R
[58] Field of Search ...................... 138/118.1, 121, 122, 138/173, 177; 17/1 R, 42, 49; 426/105, 135, 138; 428/36; 206/804

[56] References Cited

U.S. PATENT DOCUMENTS

| | | | |
|---|---|---|---|
| 3,682,371 | 8/1972 | Saika | 138/121 |
| 3,704,483 | 12/1972 | Urbutis et al. | 17/49 |
| 4,125,130 | 11/1978 | Yamamoto | 138/177 |
| 4,487,231 | 12/1984 | Wolf et al. | 138/118.1 |
| 4,648,428 | 3/1987 | Story | 138/118.1 |

Primary Examiner—James E. Bryant, III
Attorney, Agent, or Firm—William J. Crossetta; Michael L. Dunn

[57] ABSTRACT

Shirred tubular material comprising a plurality of outer folds arranged along at least two parallel and two counter-directional parallel, longitudinal extending, crisscrossing helixes and inner folds connecting opposing points of diamond shapes defined by said outer folds is disclosed together with a method for its preparation comprising repeatedly applying a set of shirring forces, each of the forces in the set being simultaneously at circular circumferential equally spaced positions along a plurality of equidistant helical lines within the periphery of said tubular material to shirr such material.

12 Claims, 2 Drawing Sheets

SHIRRED TUBULAR MATERIAL

This is a continuation-in-part of application Ser. No. 547,817, filed Nov. 1, 1983 now abandoned.

FIELD AND BACKGROUND OF THE INVENTION

This invention relates to the art of shirring flexible tubular material. More particularly, it relates to a method of shirring tubular material which provides a unique shirring pattern, thus enabling the production of a higher density, commercially acceptable shirred tubular product.

DESCRIPTION OF THE PRIOR ART

In the manufacture and use of flexible tubular materials, particularly tubular materials utilized to encase food products in the food industry, there is an increasing need to shirr such tubular materials along the longitudinal axis to allow ease in subsequent handling. Shirring is a process which involves the gathering of the tubular material along its longitudinal axis in such manner as to maintain a clear passage through the interior of the tubing and thus significantly reduce the handling size of long lengths of tubular material without detrimentally impeding passage through the tube.

In the food products industry, the shirring of tubular materials used to encase meat and processed food such as cheese or other types of food products is particularly necessary in that it allows a convenient method of filling, particularly in the manufacture of tubular meat containing products including sausages such as frankfurters, pork sausages and the like. Shirred tubular materals such as food casings and particularly sausage casings are commercially desired to possess properties in which the ratio of the length of the unshirred casing to that of the shirred casing (the shirring density) is as great as possible without damage to the tubing in the form of pinholing or otherwise. The length of shirred casing (shirred stick) should be as straight as possible with resistance to bending and breaking. The internal bore of the shirred stick should be of maximum diameter; and, the stick should be able to be inserted on and off the stuffing horn easily and readily.

In the practice of the best shirring art, e.g. U.S. Pat. No. 3,456,286, tubing of an appropriate length such as for example 40 to 160 feet (12.2–48.8 m) can be shirred to produce shirred casing sticks of a minimum length of from about 4 to about 16 inches (10.2–40.6 cm) or more in length respectively. At such high densities, i.e. 8 feet per inch (0.96 m/cm) or more, defects, such as pinholing, were not uncommon. Such shirred casing sticks can be stuffed with meat or foot product by manual or automatic operation. In a typical stuffing operation the stick is fitted onto a stuffing horn which is interconnected with a stuffing supply source. The stuffing is injected, under pressure, through the stuffing horn into the shirred stick which deshirrs and the stuffing fills the tubing to its original unshirred length. For reasons of economy and to speed up the stuffing operation it is commercially desirable to have a self-sustaining shirred stick, highly compressed in length, that is uniformly straight and has a large internal bore. Durability of the stick is necessary to ensure trouble free operation; high density permits stuffing of more product in a single stuffing operation; straightness is required to assure proper horn insertion operations; and, bore size is important for maximizing the speed of stuffing. Each of these factors has importance in increasing the efficiency of the stuffing process and is a demand of the industry to offset increasing labor and machinery costs.

The shirring of sausage casing is typically achieved by a common method which comprises gathering of the casing on a guide element (shirring mandrel) extended longitudinally through the bore of the casing. Typically, the casing is pushed together in an axial direction on the shirring mandrel by means of shirring elements applied to the circumference of the casing which grip the periphery of the casing and transport it axially against a controlled yielding buffer to effect folding of the casing. U.S. Pat. No. 2,010,626 discloses a method of shirring wherein crimping fingers, disposed one behind the other, are moved in the direction of the axis of the sausage casing for effecting a crimping action and forming the shirred product, much in the manner as the fingers of a hand shirring operation. U.S. Pat. Nos. 2,722,714; 2,722,715; and 2,723,201 to Blizzard et al improve the shirring process by inflating the casing over a hollow shirring mandrel and shirring by contact with shirring lugs carried on endless belts. The shirring lugs are staggered so that the space opposite any given contacting shirring lug is free from application of shirring forces. U.S. Pat. Nos. 3,461,484 and 3,454,982 describe a process for shirring sausage casing wherein rotating shirring wheels, containing shirring lugs cut into a helical curve, act as crimping fingers engaging the periphery of inflated casing in a substantially helical line of contact so that the casing is indented helically and formed into a continuous helical pleat. The patents describe the process as a sequential application of shirring forces to the periphery of the casing and progressing longitudinally of the casing along a helical line.

The shirring of casing sequentially along a helical line has proved to be of major commercial importance to the industry and has been the subject of multiple patents. U.S. Pat. No. 3,779,284 comprises a method of achieving a reverse single helical fold pattern which involves counter rotationally displacing neighboring zones of single helical line pleats from preceding neighboring zones. The reverse helical fold process has not enjoyed wide commercial success. U.S. Pat. No. 4,377,885 describes a shaftless gear device utilized in the axial spin shirring of synthetic tubular casing for achieving a helical line shirr pattern. This device is particularly adapted for shirring by formation of a continuous helical fold in accord with the process of U.S. Pat. No. 3,461,484. In the shaftless gear device, shirring rolls, containing a plurality of shirring teeth are arranged in an assembly comprising at least four rolls. The rolls are distributed in a plane transverse to a mandrel axis, equiangularly about a central opening adapted to receive the cylindrical mandrel. The shirring rolls are mounted in such manner that engagement of the shirring teeth, with inflated tubular casing mounted on the cylindrical mandrel, is staggered such as to successively engage the casing in a common zone of engagement. The entire apparatus spins, and the teeth of the shirring rolls sequentially engage the inflated casing so as to continually indent and fold the casing in a single continuous helical line.

DESCRIPTION OF THE INVENTION

It is an object of the instant invention to provide novel shirred tubular material having high shirring density with a low frequency of defects, self sustaining durability, end-to-end straightness and a large interior bore. This object is achieved by a process for shirring tubular materials, in particular sausage casing wherein casing is conveyed in the direction of its longitudinal axis and is shirred, with pleating, against a counter force by means of a shirring element exerting shirring forces which act upon the periphery of the casing. By shirring force is meant a force, having a component along the longitudinal axis of the tube, which force pleats and acts to compress the tubing. The counter force usually comprises controlled advancement of previously shirred casing, which advancement is in the same direction as the casing being shirred.

In the process of this invention, a set of shirring forces is repeatedly applied to the periphery of the tube. Each of the forces in the set are applied simultaneously with each other at circular circumferentially equally spaced positions, each member of the set being applied along a separate helical line on the periphery of the tube. The set of forces advances to shirr the tube against a counterforce. "Equally spaced", as used herein, means the length of the distances or spaces being compared vary by less than about 25% from each other. "Repeatedly applied" means that the set of forces is subsequently again applied, after the previous application of the set of forces. The subsequent application of the set of forces occurs at another different set of equally spaced positions where each one of such positions lies on one of the original helical lines.

The shirred product of the invention is a densely shirred tubular material having a central, interior axial bore and a substantially cylindrical outer surface, said shirred tubular material comprising a plurality of outer folds which when the tubular material is opened are arranged along at least two parallel and at least two counter-directional parallel, longitudinal extending, crisscrossing helixes and inner folds proximate a plane perpendicular to the longitudinal axis of the tube, connecting opposing points of shapes defined by the outer folds. The shapes are commonly diamond shapes. The outward folds may optionally be arranged along 3,4 or more of such parallel and 3,4 or more of such counter-directional parallel helixes.

Tubular material which can be so shirred comprise substantially any flexible material, sufficiently thin walled, which can withstand the shirring forces without being destroyed. Typical flexible materials used for food casings may be comprised of natural and synthetic polymers, plastics, proteins, carbohydrates and the like such as collagen, alginates, starches or cellulosic materials such as cellulose esters, cellulose ethers and regenerated cellulose, as well as other natural, synthetic or artificial materials.

In one embodiment of the invention there is provided an elongate, durably self-sustaining stirred stick of tubular material having high shirr density. The outer peripheral surface is substantially cylindrical and visually appealing comprising a closely compacted patterned appearance. The internal bore is substantially straight from end to end of the stick. Such shirred stick can be prepared using a plurality of the shirring devices disclosed in the prior art modified to approximately simultaneously effect contact on inflated tubular material along two or more helical lines in accord with the process of this invention. It is the simultaneous effecting of contacts, along continuous helical lines, at two or more equidistant points on the peripheral surface of the tubing, in a plane approximately perpendicular to the longitudinal axis of the tubing, which, upon compression forms the unique, usually diamond, patterned folds of the invention resulting in crisscrossing helixes.

Figure 1:
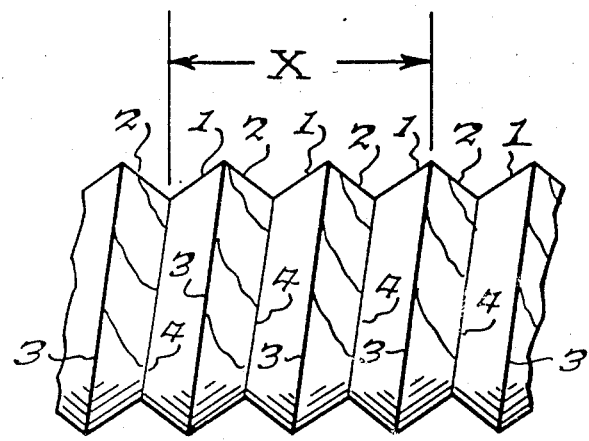
FIG. 1 is a representation of the shirring arrangement created by helical line shirring of the prior art.

Referring now to FIG. 1, wherein the shirring pattern of the prior art is represented, Zone X represents an expanded section of a shirred and compressed casing stick in accord with the processes and devices of U.S. Pat. Nos. 3,779,284 and 4,377,885. Therein, each pleat comprises outer fold 3 and inner fold 4, joined through pleat sides 1 and 2. Inner fold 4 is formed by the successive indentive engagement of shirring lugs or teeth along the helical line depicted as the inner fold. Engagement along the helical line is achieved by continuously spinning the lugs about the casing while continuously advancing the casing through the point of engagement. Outer fold 3 is substantially parallel to inner fold 4 and is formed by compressing the indented casing axially against a buffer.

Figure 2:
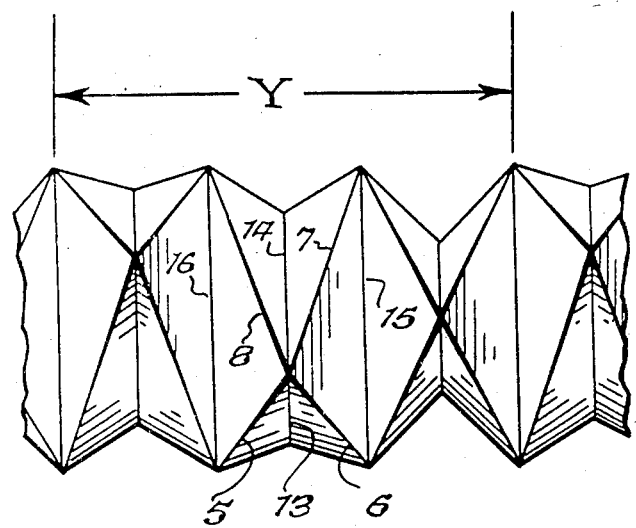
FIG. 2 is a representation of the counter-directional, crisscross helical arrangement of the shirred tubular material embodying this invention; and, FIG. 3 is a frontal partial sectional view of a prior art spin shirring head which has been modified to achieve the counter-directional, crisscross helical design embodiment of the invention.

FIG. 2 represents the shirring pattern of an embodiment of the instant invention where the shirred casing is in an open position. Therein, Zone Y represents an expanded section of a shirred and compressed casing stick wherein each pleat comprises outer folds 5, 6, 7, and 8, and inner folds 13, 14, 15, and 16. Inner folds 13 and 14 are formed approximately simultaneously with each other by the approximate simultaneous engagement of opposing shirring teeth. Inner folds 15 and 16 are formed by successive circumferential circular engagement of opposing shirring lugs or teeth along separate helical lines achieved by continuously spinning the lugs or teeth about the casing while continuously advancing the casing through the points of engagement. If the center points of inner folds 13 and 15 were connected they would fall on the same continuous helical line, while the center point of inner folds 14 and 16 would be on a substantially parallel continuous helical line therewith. Outer folds 5 and 7 lie along an approximate continuous helical line, while outer folds 6 and 8 lie along a substantially counter-directional continuous helical line therewith, with both being formed by the compression of the casing axially against the previously shirred casing (counterforce). The formation of each of outer folds 5, 6, 7, and 8 can occur without rotation of the casing. The points of crossing of counter-directional outer folds usually define the points of diamonds which in turn are traversed by inner folds. In the preferred embodiment, the four points of each diamond are slightly rotationally displaced from the corresponding point of each preceding neighboring diamond, in a neat and orderly manner. Upon compression against the counterforce, the points are so interspaced as to intermesh in the direction of the compression thus adding greatly to the durability and end-to-end straightness of the stick.

Figure 3:
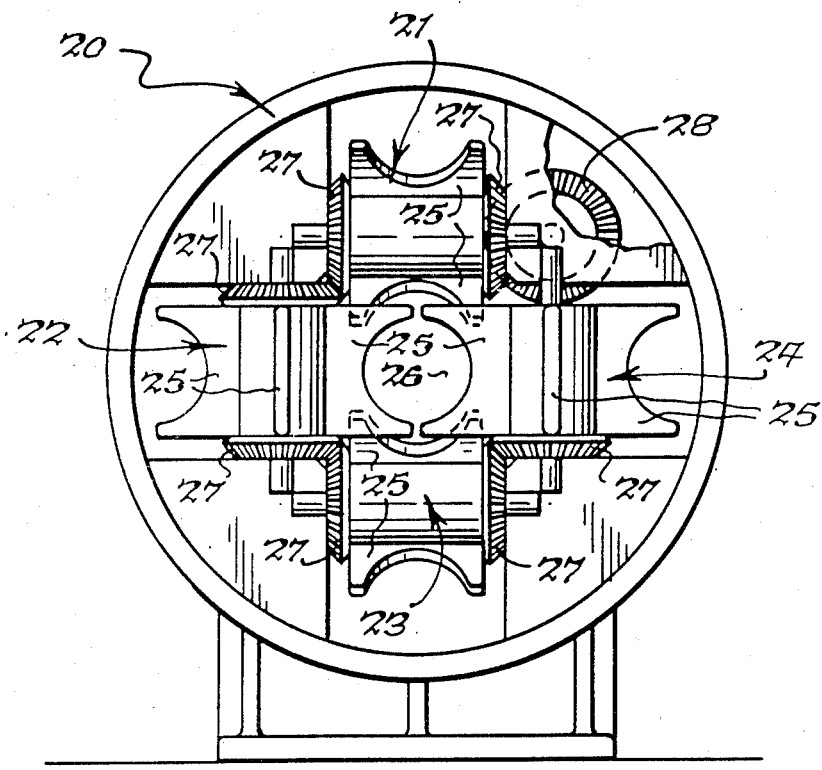
Figure 4:
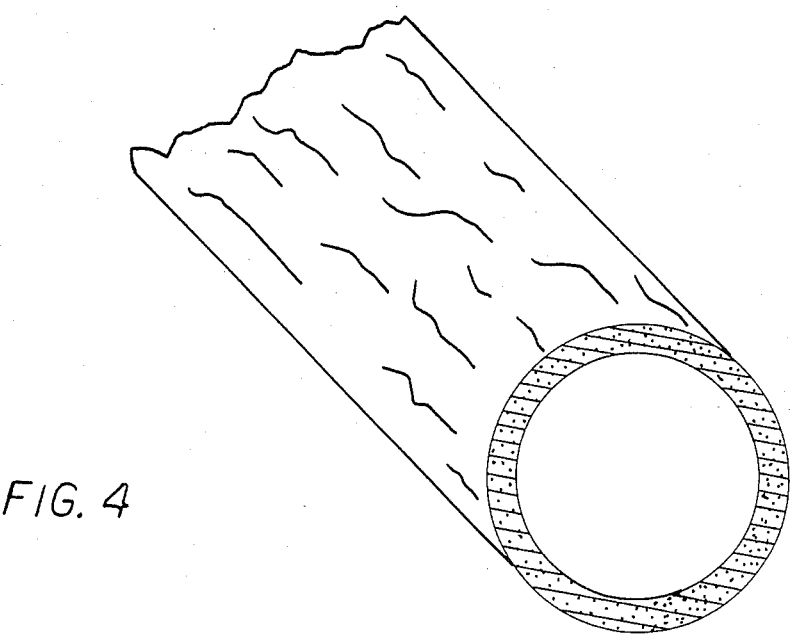
FIG. 4 is a representation of tubular material comprising reinforcing fibers, an alternate embodiment of the invention.
Figure 5:
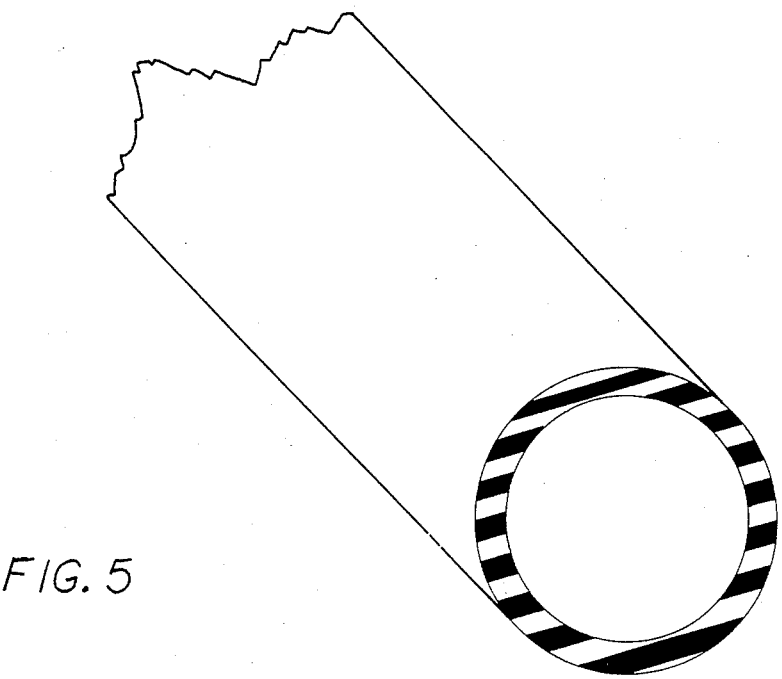
FIG. 5 is a representation of tubular material comprising thin walled plastic, an alternative embodiment of the invention.

One particularly effective device which can be modified to produce the shirred stick of the instant invention is the shaftless gear device for axial shirring disclosed in U.S. Pat. No. 4,377,885. FIG. 3, represents such modified spin shirring head wherein there is described a spin shirring apparatus which essentially comprises four shirring rolls, 21, 22, 23 and 24, each having a plurality of concave arcuate shirring teeth 25 thereon, each of the rolls being in a common plane on assembly 20 and being distributed equiangularly about a central opening 26 which is dimensioned to receive a cylindrical mandrel. Each of the four rolls is taper (bevel) geared 27 connected to each other such that each roll turns at the same speed as each other and each of the shirring teeth 25 engage mandrel mounted inflated tubular material to be shirred with substantially the same force and speed and are in continuous timed relationship. Shirring roll 21 is driven at tapered gear 27 by tapered gear drive means 28 which is interconnected with drive means (not shown) as disclosed in U.S. Pat. No. 4,377,885.

The shirring rolls of the device, as described in U.S. Pat. Nos. 4,377,885 and 4,354,295 are set in timed relationship such that the shirring teeth of the various rolls engage the tubular material sequentially about the rotational axis of the spin shirring apparatus, successively overlapping in the zone of engagement with the tubular material, so as to form a single, continuous helical pleat in the tubular material. In the method of the invention, the timing of the four shirring rolls in the apparatus of FIG. 3 is not to cause sequential engagement of shirring teeth, but is such as to substantially cause the shirring teeth of opposing shirring rolls to engage the inflated tubular material approximately simultaneously at opposing, approximately circular, circumferential points. Thus, a shirring tooth 25 of shirring roll 21 will engage the tubing on the mandrel at approximately the same time as a corresponding shirring tooth 25 on shirring roll 23; and, shirring tooth 25 on shirring roll 22 will engage the tubing on the mandrel at approximately the same time as a corresponding shirring tooth 25 on shirring roll 24. It is believed that this engagement of opposing shirring teeth, coupled with the axial spinning of the apparatus and advancement of the tubing therethrough by the sweep of the shirring teeth through the points of engagement, trace parallel circumferential lines whose center points lay in rough parallel helical arrangement. The advancement of the tubing against a restraint causes the casing between the traced helical lines to unexpectedly fold in a manner forming diamond patterns, the outer folds which define counter rotational crisscrossing helixes. The inner folds, define lines that bisect the diamond pattern proximate a plane perpendicular to the longitudinal axis. In the completed shirred stick, the points of the diamond intermesh at the periphery of the compressed shirred casing providing an ordered appearance and increase the durability of the shirred stick to breakage.

Engagement of shirring teeth of opposing rolls at opposing circular circumferential points of the inflated tubing need not be in exactly simultaneous nor in exactly circular placement. Engagment of opposing shirring teeth at points approximately within a 20° arc from the perpendicular to the longitudinal axis of the tubing will produce the aforedescribed shirred tubing. Thus, the terms "simultaneous" and "circular" as used herein are defined as falling within the engagement limitations of the aforesaid approximate 20° arc and will include opposing engagements which circumscribe an elipse within said 20° arc.

The ordered pattern of the shirred stick of this invention provides an unexpected benefit to density. Shirred densities in excess of 8 feet/inch (0.96 m/cm) are readily attainable with densities of from about 8 feet/inch (0.96 m/cm) to about 12 feet/inch (1.44 m/cm) being preferred. Such high densities are easily obtainable without subsequent compression and without damage to the casing. Though high density is an unexpected benefit, it should be understood that the method of the invention can easily be utilized to produce shirred sticks having a density well below 8 feet/inch (0.96 m/cm).

In accord with the method of the invention a Kollross, Keuko 5 shirring machine fitted with a shaftless gear assembly as described in U.S. Pat. Nos. 4,377,885 and 4,354,295, having four interconnected shirring rolls, was modified for simultaneous engagement of opposing shirring rolls in accord with FIG. 3 and the method of the invention. During the shirring operation the gear assembly was rotated at about 750 rpm and tubular fibrous reinforced cellulosic casing having a diameter of about 43.43 mm and a thickness of about 7.6 mil (0.030 mm) was fed, with air inflation, over a 29 mm diameter shirring mandrel at the rate of about 7 meters/sec. The material was shirred against the doffing bushing of a controlled counterforce withdrawing mandrel. The resulting shirred product had a shirr density of about 8.92 ft/in (1.07 m/cm) and comprised a straight stick having resistance to bending and breakage with a neatly patterned outside surface having an interspaced pattern of intermeshed points. Upon opening the shirred casing, the outside folds of the shirring pattern appeared arranged along two crisscrossing helical lines defining approximately diamond formulations which in turn were traversed by inner folds.

Although the invention has been described in considerable detail with respect to preferred embodiments thereof, it will be apparent that the invention is capable of numerous modifications and variations, apparent to those of skill in the art, without departure from the spirit and scope of the invention, as defined in the claims.

I claim:

1. A shirred tubular flexible material sausage casing having a central axis bore, said shirred tubular material comprising a plurality of outer folds arranged along at least two parallel and at least two counter-directional, parallel, longitudinal extending, crisscrossing helixes defining substantially diamond shaped patterns, and a plurality of inner folds arranged in a plane substantially perpendicular to the longitudinal axis of the tube, connecting opposing points of said diamond shaped patterns defined by the crisscrossing of said outer folds wherein said opposing points are rotationally displaced from the corresponding point of each preceding neighboring shaped pattern.

2. The shirred tubular material of claim 1 comprising regenerated cellulose.

3. The material of claim 2 containing reinforcing fibers.

4. The material of claim 1 comprising collagen.

5. The shirred tubular material of claim 1 comprising thin walled plastic.

6. The shirred tubular material of claim 1 wherein said outer folds are arranged along two parallel and two counter-directional parallel, longitudinal extending, crisscrossing helixes.

7. The shirred tubular material of claim 1 wherein said outer folds are arranged along three parallel and three counter-directional parallel, longitudinal extending, crisscrossing helixes.

8. The shirred tubular material of claim 1 wherein said outer folds are arranged along four parallel and four counter-directional parallel, longitudinally extending, crisscrossing helixes.

9. The sausage casing of claim 1 wherein shirr density is from about 8 to about 12 feet/inch.

10. The sausage casing of claim 1 wherein shirr density is in excess of 8 feet/inch.

11. The tubular material of claim 1 selected from the group consisting of regenerated cellulose, collagen and thin-walled plastic.

12. The tubular material of claim 1 containing reinforcing fibers.

* * * * *